Nov. 21, 1939.  D. E. WHITE  2,180,649
NONSKID TIRE
Filed July 20, 1938   2 Sheets-Sheet 1
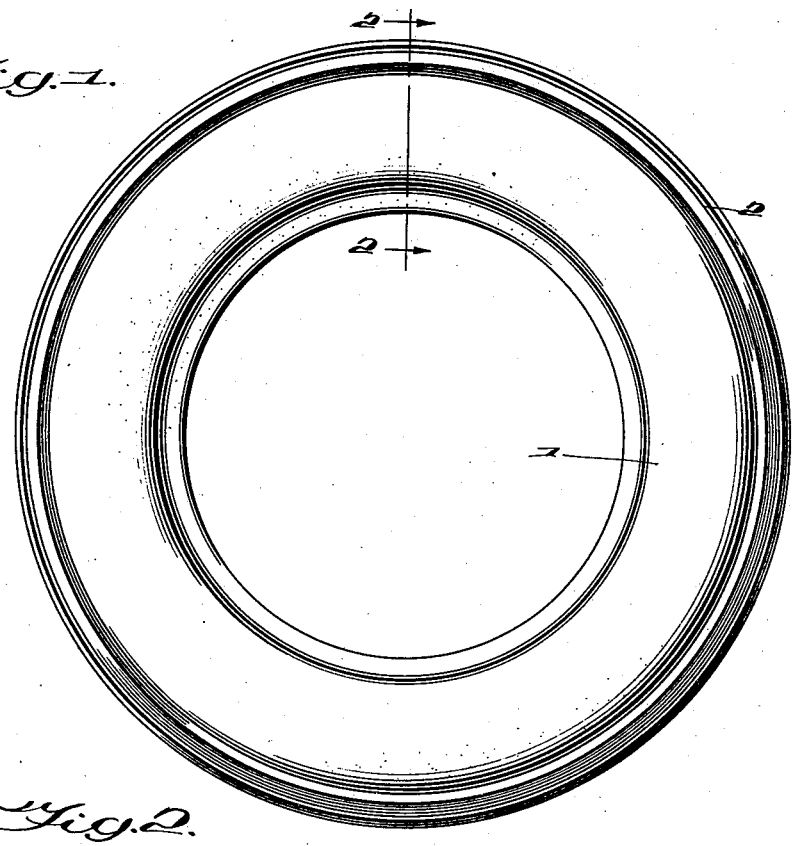
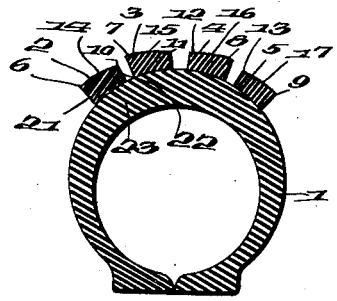
Inventor
David E. White,
By Mason & Mason
Attorneys Nov. 21, 1939.     D. E. WHITE     2,180,649
NONSKID TIRE
Filed July 20, 1938     2 Sheets-Sheet 2
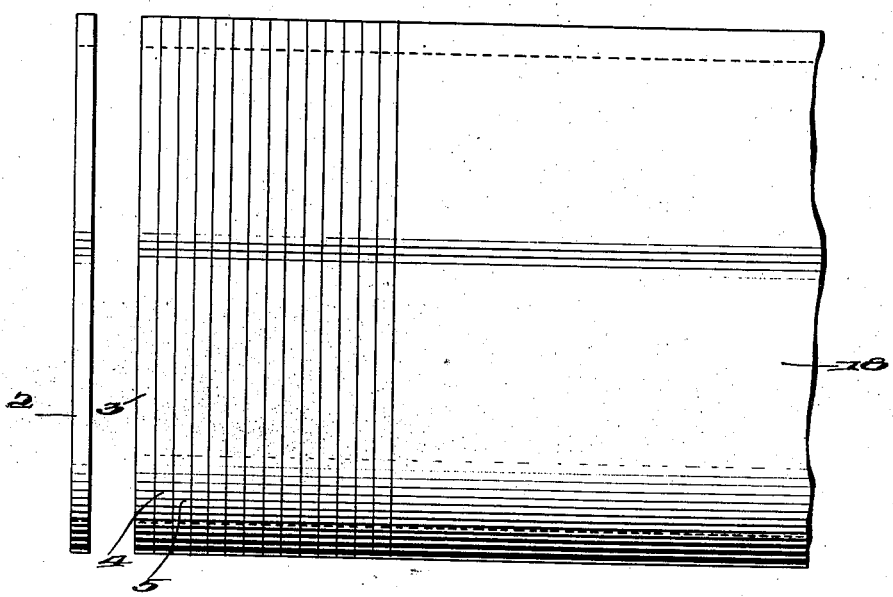
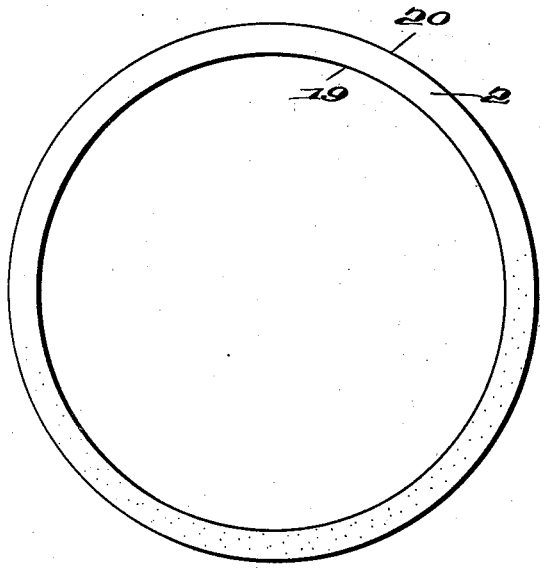 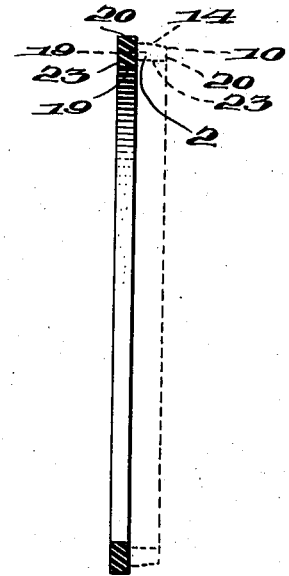
Inventor
David E. White,
By Mason & Mason
Attorneys Patented Nov. 21, 1939

2,180,649

UNITED STATES PATENT OFFICE 2,180,649

NONSKID TIRE

David E. White, Silver Spring, Md.

Application July 20, 1938, Serial No. 220,353

15 Claims. (Cl. 152—209)

This invention relates generally to tires, and more particularly to pneumatic tires, and the tread portions thereof, although it may apply to other types of tires as well, such as solid tires; or the invention may apply to existing tires, either pneumatic or solid, which require a new tread surface.

An object of the invention is to provide a tire, or a tread surface thereof, which exhibits maximum nonskid properties and non-rumble properties.

Another object of the invention is to provide a tire having a surface that resists skidding in a direction either transverse or diagonal, as well as longitudinal to the direction of movement of a vehicle equipped with such tires.

Another object of the invention is to provide a tire with a tread surface which has good wear resisting qualities, and superior road gripping qualities.

Still another object of the invention is to provide a tire having circumferential ribs or transverse ribs which, in stopping, as by the application of brakes to the wheels of said tires, cause portions of said ribs to become distorted or out of line with other portions or zones of said ribs, thus providing an effective braking surface which more fully engages the road surface, particularly where such surface is wet or covered with snow or ice.

Another object is to provide a tread surface for a tire that, in use, and when subjected to braking action, causes the untensioned portions to pile up on the road surface, and the tensioned portions to resist piling up on said road surface.

And still another object of the invention is to provide tire tread having a series of ribs, each rib having longitudinally extending portions, which are under a different tension than other longitudinal portions of the same rib.

Other objects will appear hereinafter throughout the specification.

In the drawings:

Figure 1 is a side elevation of one form of the invention, wherein the ribs extend circumferentially of the tire;

Figure 2 is a cross-section taken on the line 2—2 of Figure 1;

Figure 3 is a fragmentary side elevational showing of a tire casing disclosing another form of the invention;

Figure 4 is a cross-sectional view on the line 4—4 of Figure 3;

Figure 5 is a side elevational section of a rubber tube from which the ribs used to make up the tire tread have been cut and showing one of the ribs cut off from said tube;

Figure 6 is a side elevation showing one of said ribs; and

Figure 7 is a cross-sectional view of the view of the rib shown in Figure 6, but showing in dotted lines the configuration said rib will assume as applied to a tire; and Figure 8 is a cross-sectional view similar to Figure 2 of another type of tire, showing two ribs attached to a flat portion of a new or used tire.

In the embodiment disclosed in Figures 1 and 2, the tire casing proper is indicated by the numeral 1, and the ribs which have been applied thereto are indicated by the numerals 2, 3, 4 and 5. Any suitable number of ribs may be provided for each tire, but the preferred form of my invention comprises the application of an even number of said longitudinal ribs, viz., 2, 4, 6, 8, or more ribs of multiples are used, for reasons to be hereinafter explained.

In Figure 2 I have illustrated four ribs. The circumferential portions which are indicated by the numerals 6, 7, 8, and 9, of said ribs, which extend clear around the tire, are preferably not under tension, or in any event such portions are only under light tension.

The inner diameter of the ribs adjacent said portions 6, 7, 8, and 9, is of substantially the same diameter as that of the tire casing to which it has been applied, and no stretching occurs adjacent said portions when the ribs are applied and affixed to said tire casing adjacent these side edges. Circumferential portions 10, 11, 12, and 13, are under tension, that is, stretching occurs to a considerable degree at the midline of each rib, as indicated by the numerals 14, 15, 16, and 17. Tension progressively increases on one side thereof, and decreases progressively on the opposite side thereof.

In Figures 5, 6 and 7 is disclosed one method by which it is possible to obtain a rib having the desired characteristics, viz., a rib having one circumferential side under tension, and the opposite circumferential side being in an untensioned or comparatively untensioned state. The rubber cylinder 18 (Figure 5) is cut as indicated by a knife or other suitable cutting device, to form the ribs 2, 3, 4 and 5, which are cut off from the tube in the same manner that a loaf of bread is divided up into slices. Each rib resembles a very much enlarged sealing ring, such as is used to seal the top of a preserving jar, such as a Mason jar.

The rings, at the time of application to the tire, are turned so that the inner and outer cylindrical portions 19 and 20, respectively, form the sides 21 and 22 of the ribs, as applied to the tire (see Figure 2). It will thus be noted that the side 22 is under the greatest tension and the side 21 is under the least tension, the tension decreasing from the side 22 to the side 21.

The rings which have been cut off from the tube 18 are each turned on their sides as illustrated in Figure 7, and it is one of these sides 23 which now becomes the bottom or forms the inner circumferential portion of the rib as applied to the tire. Alternate ribs are preferably turned so that when vulcanized or cemented to the tire body, the tensioned side of one ring is opposite to the tensioned side of another ring lying most closely adjacent thereto, while the comparatively untensioned sides also lie immediately adjacent to each other, as this will insure better tractive and braking qualities, but the invention is not limited to this arrangement. The ribs may be fastened to the outer surface of the tire by any one of the well known methods now used for applying rubber to rubber. For instance, vulcanization may be resorted to, but when used, extreme care must be exercised to prevent the flow of the rubber comprising the rib, particularly the outer or tread surface thereof. Only a small portion of each rib adjacent the bottom surface or inner periphery 23 thereof should be heated such as to cause the rubber to flow or become semi-plastic, as vulcanization or any other method which causes the rubber to become plastic or flow, destroys the stress or tension which should be inherent in each rib of the completed tire.

The method of attaching the ribs to the tire casing forms no part of the present invention, which ribs may be attached to the tire by any suitable means, such as by vulcanizing, cementing, or by the application of rivets, or in any other suitable manner.

Referring to Figs. 1, 2 and 8, again, it will be noted that when tractive force is applied to said tires, as when said tires are mounted on the rear or driving wheels of an automobile, or when braking pressure is applied to the wheels on which said tires are mounted, there is a greater tendency of the rubber to become distorted and pile up on the circumferential portion which lies on that side of the medium line 14, 15, 16, and 17, that contains the untensioned or substantially untensioned rubber. By reference to Figure 2, for instance, it will be noted that the portions referred to are: that portion which lies to the left of the medium line defined by the numeral 14 of rib 2; that portion which lies to the left of the medium line defined by the numeral 15 of rib 3; that portion which lies to the right of the medium line defined by the numeral 16 of rib 4; and that portion which lies to the right of the medium line defined by the numeral 17 of rib 5.

The unequal deformation of each rib which results from the forces to which the tires are subjected in use, is such that portions of each tire rib assume different relation to other portions of the same rib, and become distorted, some portions (untensioned) are more pliable and tend to creep more than other (tensioned) portions of the same ring.

This unequal deformation, due to differences of tension, prevents skidding both transversely and longitudinally of the line of travel of the vehicle, and results in an increased gripping of the tire tread on the road surface. The increased tension or stretching adjacent the side 22 of rib 2, causes the rib to be of lesser depth adjacent the side 22, and of greater depth adjacent the side 21, for the reason that the side 22 was formerly the inner cylindrical portion 20 of the ring 2. Such tensioned part is similar to a rubber band which has been stretched and which has become thinner thereby.

Figures 3 and 4 illustrate another embodiment of the present invention where the ribs have been applied transversely to the tire. One method of constructing said ribs is to proceed as heretofore explained, viz., cut rings from a rubber cylinder as shown in Figs. 5, 6 and 7. A ring as shown in Figure 6 is turned on its side as shown in dotted lines in Figure 7, and may then be further cut to form the crescent shaped ribs indicated by the numerals 24 and 25 in Figures 3 and 4.

The inclination of the tensioned and untensioned portions of the ribs, as shown in Figure 3 has been exaggerated to indicate the portions. Each rib, 24 and 25, is provided with a side portion 26 and 27, respectively, which is not under tension, while those portions indicated by the numerals 28 and 29 are under tension.

Referring to Figure 8, this illustrates an embodiment of the invention substantially the same as that shown in Figure 2, except that the tire casing 1, where shown, is provided with flat portion 32, which flat portion 32 may be formed as the surface of a newly made tire, or said surface may be the worn down surface of a used tire. The numerals 30 and 31 in this instance, show a pair of tire ribs having tread surfaces 33. The tensioned portions of the ribs are opposite each other, as represented in this figure.

As illustrated, these tensioned portions 28 and 29 face each other, and the untensioned portions 26 and 27 also face each other.

An important resulting feature that will be apparent to one skilled in the art, is that the tendency of the peripheral or other portions of the tire to move radially outward under the influence of centrifugal force when travelling over a highway at high speed is counteracted. This is because of the fact that the tensioned ribs, due to their tendency to contract, exert a force which is in the direction of the axial center of the tire, and which is in a direction exactly opposite to the direction of movement of centrifugal force. The tendency of the tread portion to separate from the carcass of the tire at high speeds (when mounted on a vehicle wheel), is materially reduced, if not entirely overcome, and "slapping" of the tire on the pavement is overcome.

It is within the scope of this invention to mount the ribs, which run circumferentially around the periphery of the tire, transversely of the tire, or at any angle to the tread surface thereof, on a base or strip of rubber (not shown), that is afterward attached by any suitable means, such as vulcanizing, cementing, etc., to the peripheral surfaces of a new tire; or to the tread surface of a tire, the treads of which have been worn down to a flat surface.

This application is addressed to the structure of a tire which may be made in accordance with the method disclosed and claimed in my co-pending application, Serial No. 220,354, filed July 20, 1938, although this invention is not limited to the method described in my said co-pending application.

The tire of this invention will be found to have improved nonskid properties due to the fact that different parallel portions of the same tire rib cause the rib to be distorted unevenly when the brakes are applied. While it is true that the ribs of any tire tend to become distorted when under braking pressure, some more than others, the tire of this invention, when being braked, as distinguished from the tires of the prior art, exhibits a tendency, (the ribs thereof), to move transversely to the line of motion of the tire, and in the direction of the untensioned sides of the ribs thereof. This results in imparting to the tire, improved braking qualities.

It is to be understood that the above description and the drawings are for illustrative purposes only, and that said ribs may be spaced further apart, or closer together than illustrated, and the thickness of the ribs may be varied to suit requirements. It is to be further understood that said ribs may be arranged diagonally or at any angle to the periphery of the tire body. I therefore desire to be limited only to the extent set out in the appended claims.

I claim:

1. A tire for vehicles having a tread comprising a plurality of ribs, each rib having a tensioned portion and another substantially untensioned portion forming part of the same rib.

2. A tire for vehicles having a tread comprising a plurality of ribs extending circumferentially of the tire, each rib having a tensioned portion and another substantially untensioned portion forming part of the same rib.

3. A tire for vehicles having a tread comprising a plurality of ribs, each rib having a tensioned portion and another substantially untensioned portion forming part of the same rib, said tensioned and untensioned portions being substantially parallel with each other.

4. A tire for vehicles having a tread comprising a plurality of ribs extending transversely of the tire, each rib having a tensioned portion and another substantially untensioned portion forming part of the same rib.

5. A tire for vehicles having a tread comprising a plurality of ribs extending transversely of the tire, each rib having a tensioned portion and another substantially untensioned portion forming part of the same rib, said tensioned and untensioned portions being substantially parallel with each other.

6. A tire for vehicles having a tread comprising a plurality of ribs, each rib having a tensioned portion and another substantially untensioned portion forming part of the same rib, the tensioned portion of each rib having its greatest tension at one of the side edges of said rib, and the untensioned portion being of less tension at the other side edge of said rib.

7. A tire for vehicles having a tread comprising a plurality of ribs extending circumferentially of the tire, each rib having a tensioned portion and another substantially untensioned portion forming part of the same rib, the tensioned portion of each rib having its greatest tension at one of the side edges of said rim, and the untensioned portion being of less tension at the opposite side edge of said rib.

8. A tire for vehicles having a tread comprising a plurality of ribs, each rib having a tensioned portion and another substantially untensioned portion forming part of the same rib, said tensioned and untensioned portions being substantially parallel with each other, the tensioned portion of each rib having its greatest tension at one of the side edges of said rib, and the untensioned portion being of less tension at the other side edge of said rib.

9. A tire for vehicles having a tread comprising a plurality of ribs extending transversely of the tire, each rib having a tensioned portion and another substantially untensioned portion forming part of the same rib, the tensioned portion of each rib having its greatest tension at one of the side edges of said rim, and the untensioned portion being of less tension at the other side edge of said rib.

10. A tire for vehicles having a tread comprising a plurality of ribs extending transversely of the tire, each rib having a tensioned portion and another substantially untensioned portion forming part of the same rib, said tensioned and untensioned portions being substantially parallel with each other, the tensioned portion of each rib having its greatest tension at one of the side edges of said rib, and the untensioned portion being of less tension at the other side edge of said rib.

11. A tire for vehicles having a tread comprising a plurality of ribs, each rib having a tensioned portion and another substantially untensioned portion forming part of the same rib, the tensioned portion of each rib having its greatest tension at one of the side edges of said rib, and the untensioned portion being of less tension at the opposite side edge of said rib, and the tensioned side edge of one rib being juxtaposed to the untensioned side edge of an adjacent rib.

12. A tire for vehicles having a tread comprising a plurality of ribs extending circumferentially of the tire, each rib having a tensioned portion and another substantially untensioned portion forming part of the same rib, and the tensioned side edge of one rib being juxtaposed to the untensioned side edge of an adjacent rib.

13. A tire for vehicles having a tread comprising a plurality of ribs, each rib having a tensioned portion and another substantially untensioned portion forming part of the same rib, said tensioned and untensioned portions being substantially parallel with each other, and the tensioned side edge of one rib being juxtaposed to the untensioned side edge of an adjacent rib.

14. A tire for vehicles having a tread comprising a plurality of ribs extending transversely of the tire, each rib having a tensioned portion and another substantially untensioned portion forming part of the same rib, and the tensioned side edge of one rib being juxtaposed to the tensioned side edge of an adjacent rib.

15. A tire for vehicles having a tread comprising a plurality of ribs extending transversely of the tire, each rib having a tensioned portion and another substantially untensioned portion forming part of the same rib, said tensioned and untensioned portions being substantially parallel with each other, and the tensioned side edge of one rib being juxtaposed to the tensioned side edge of an adjacent rib.

DAVID E. WHITE.